INVENTORS
William H. Palmer &
BY Rolland B. Wallis
E. E. James
ATTORNEY

INVENTORS
William H. Palmer &
BY Rolland B. Wallis
ATTORNEY

United States Patent Office 3,157,057
Patented Nov. 17, 1964

3,157,057
PLATE TYPE FRICTION COUPLING
William H. Palmer, Olmsted Falls, and Rolland B. Wallis, Lakewood, Ohio, assignors to General Motors Corporation, Detroit, Mich., a corporation of Delaware
Filed Aug. 4, 1961, Ser. No. 129,429
10 Claims. (Cl. 74—378)

This invention relates generally to couplings; more particularly to clutches or brakes having a plurality of interleavened plates atlernately splined to concentrically spaced driving and driven reaction members and axially shiftable to effect frictional driving engagement therebetween; and with regard to certain more specific aspects thereof, to a compound fluid pressure actuated clutch mechanism having particular application to a marine propulsion drive.

In compound marine clutches of the type shown and described in U.S. Patent 2,925,156 to Arthur F. Grant and Robert R. King, the ahead and astern clutch units are selectively engageable to control the speed and direction of the propeller drive shaft. Such alternate clutch engagement counterrotates the elements of the disengaged unit at twice the driving speed of the engine. The clutch units must be able to accommodate limited angular and lateral axial misalignments between the engine and speed reduction means and must be capable of accomplishing high speed drive reversals comparable to those possible with electrical drives. To reduce the propulsion driving speed below that provided by the engine idle speed limit, the clutch units must be capable of providing prolonged periods of controllable slip operation. Such operation tends to result in destructive impacting and chafing of the plate driving spline connections. Unless properly dissipated, the heat generated by such operation necessarily results in thermal growth and distortion of the clutch elements and in checking and uneven wear of the clutch plate surfaces. Under extreme conditions, destructive thermal lock-up of the several clutch units may occur.

In its broader aspects, the invention contemplates an improved clutch or brake mechanism of the type indicated having an improved plate structure providing continuous cooling air flow over the frictionally engaged surfaces of the plate elements under high speed reversing and controlled slip operation and resilient spline means frictionally dampening and preventing axial shifting of the plate elements under disengaged operating conditions.

The foregoing and other objects, advantages and features of the invention will be apparent from the following description of a preferred illustrative embodiment thereof having reference to the accompanying drawings, in which.

Figure 1:
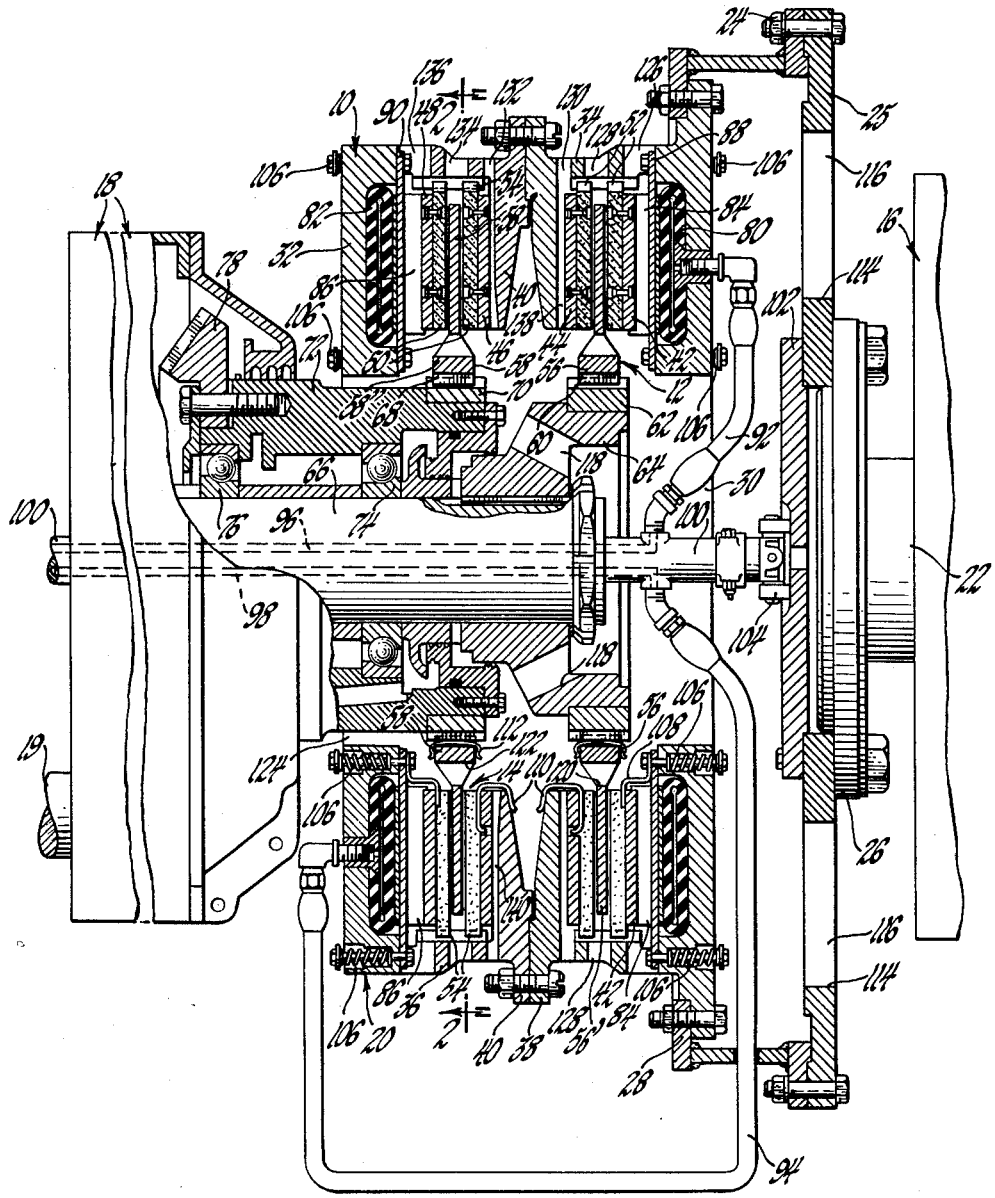
FIGURE 1 is a view of portions of a marine propulsion drive partially broken away and in section to show the details of a reverse drive coupling incorporating the invention.

Referring more particularly to FIGURE 1, a marine reversing clutch is indicated generally by the reference numeral 10 and includes an ahead coupling 12 and an astern coupling 14. The two coupling units are selectively energizable to drivingly interconnect a unidirectional engine 16 through a suitable reverse-and-reduction gear drive mechanism 18 to a propeller drive shaft 19 to provide either forward or reverse propulsion of the ship. The coupling units are independently and selectively engageable by fluid pressure supplied through the operation of suitable associated control mechanism such as that shown and described in the aforementioned Patent 2,925,156. The coupling units are operable in a first range of operation to provide controllable slip of the propeller shaft output relative to the driving engine, the speed of the output shaft being substantially proportional to the actuating pressure applied up to a given pressure at which either coupling is normally fully engaged under engine idle speed and load operating conditions. Further increases in the supplied actuating pressure serves to increase the speed and torque capacity of either coupling unit.

The reversing clutch 10 includes a cylindrical housing assembly 20 which serves as a common driving input member for both the forward and reverse coupling units. This housing is drivingly connected to an engine driven shaft 22 through an annular adapter comprising a flexible driving spider or disc 25 which is secured inwardly to a mounting flange 26 on the shaft 22 and outwardly to one end of a cylindrical spacer 28. The opposite end of the spacer is secured to the adjacent end of the housing assembly 20. The drive housing comprises two annular longitudinally spaced end plates 30, 32 and two intermediate members 34, 36 secured together by suitable means as shown. The intermediate housing members 34 and 36 have cylindrical outer portions extending axially from the end plates 30 and 32 to adjacent mating end portions extending radially inwardly to form two flanges 38, 40 in parallel spaced relation to the end plates 30 and 32. The drive housing members 30, 34 and 32, 36 thus cooperates to define two annular recesses mounting the ahead and astern coupling units 12 and 14, respectively.

Figure 2:
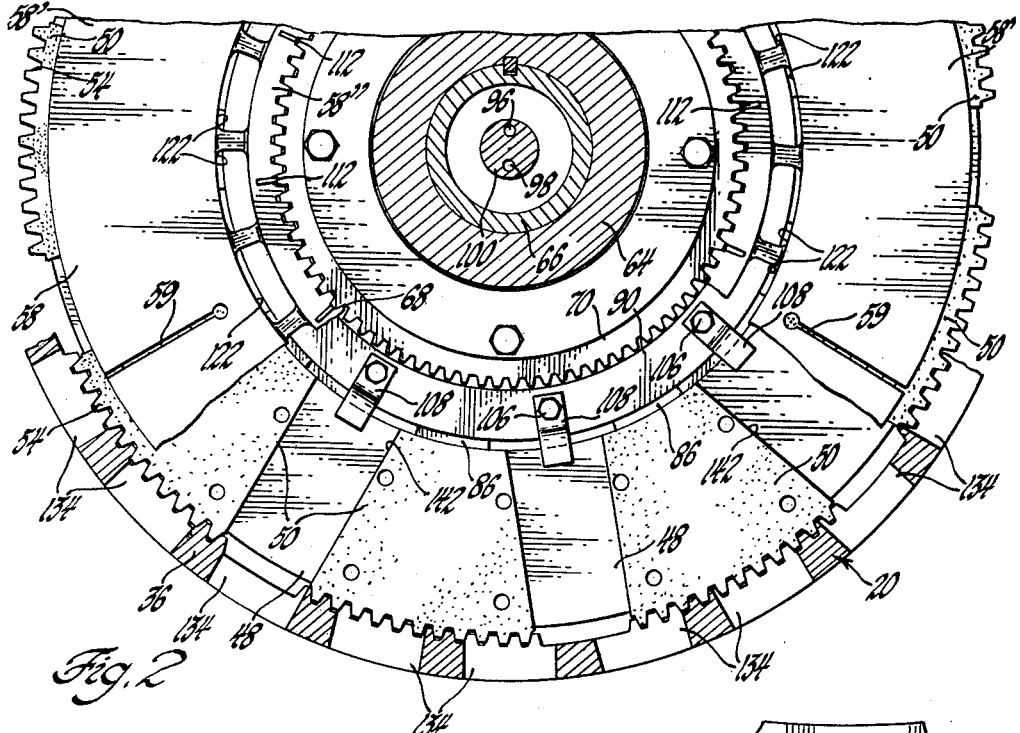
FIGURE 2 is a fragmentary transverse sectional view of the astern clutch unit and is taken substantially in the directicon of the arrows and in the plane of the line indicated at 2—2 of FIGURE 1.
Figure 4:
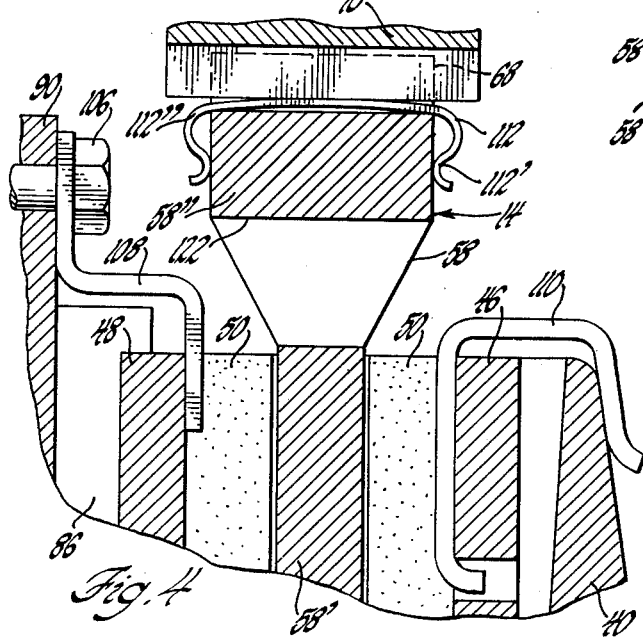
FIGURE 4 is an enlarged fragmentary view corresponding to a portion of FIGURE 1.
Figure 3:
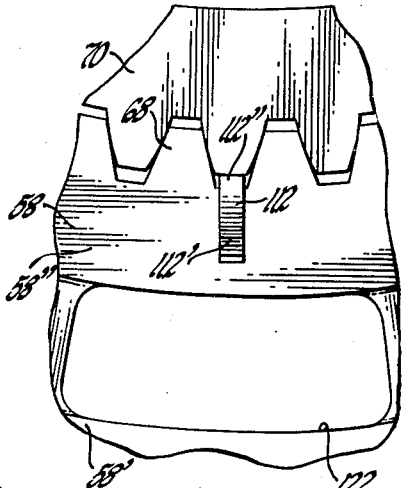
FIGURE 3 is an enlarged fragmentary view corresponding to a portion of FIGURE 2.

The elements of the ahead and astern coupling units 12 and 14 are interchangeable and each includes two axially spaced annular backing plates 42, 44 and 46, 48, respectively. These backing plates each carry a plurality of equiangularly spaced arcuate shoes 50 of suitable nonmetallic or cerametallic frictional material. The shoes of the ahead and astern coupling units are externally splined at 52 and 54 to the intermediate housing members 34 and 36, respectively, and are axially shiftable to frictionally and drivingly engage ahead and astern output clutch plates 56 and 58 sandwiched therebetween. The clutch plates 56 and 58 are relatively thin and flexible in their outer shoe-engaging portions 56' and 58'. These outer plate portions are radially slotted, as shown at 59 in FIGURE 2, to accommodate angular misalignments between the several clutch plates and to limit or prevent heat induced distortion of the driven plates with consequential loss of frictional working surface and locking of their spline teeth. The plates 56 and 58 are flared inwardly to substantially thicker hubs 56" and 58". The hub of the clutch plate 56 is internally splined at 60 to a ring 62 secured to an ahead driving hub 64. The ahead driving hub 64 is in turn drivingly connected to the adjacent end of a hollow input shaft 66 of the reverse-and-reduction gear unit 18. The inner hub of the clutch plate 58 is similarly splined at 68 to a ring 70 drivingly secured to the adjacent end of a hollow stub shaft 72. This stub shaft is journaled on the ahead input drive shaft 66 by spaced anti-friction bearinggs 74 and 76 and serves as an astern input member for the gear unit 18. The design clearances of the splines 60 and 68 necessarily permit axial shifting of the plates 56 and 58 to take up clutch plate and shoe wear and accommodate the angular and lateral axial misalignments normally present between the several input and output members in such marine installations. As indicated above, the ahead and astern input drive shafts 66 and 72 are drivingly connected to the propeller shaft 19 through a conventional reversing-and-reduction gear mechanism, a bevel gear of a differential reversing gear being partially shown at 78.

Frictional driving engagement is effected between the several plate carried shoes and the ahead and astern output driving plates 56 and 58 by the selective inflation of two annular tubes 80 and 82 carried by the drive housing end plates 30 and 32, respectively. The axial expansion of either tube 80 or 82 is transmitted to the several adjacent clutch plates against the intermediate housing flanges 38 and 40, respectively, through a plurality of fingers or spokes 84 and 86 extending radially of two intermediate heat insulating plates 88 and 90. Fluid under pressure is supplied to and discharged from the clutch actuating tubes 80 and 82 by way of two flexible air tubes 92 and 94, respectively, which are in turn connected to air passages 96 and 98 extending longitudinally through an air supply tube or shaft 100. The air supply shaft is journaled in and projects beyond the hollow ahead drive shaft 66 of the gear mechanism. The distal end of the supply shaft is connected to suitable inflation supply control means, not shown. The engine adjacent end of the air supply tube 100 is drivingly connected to and supported by the clutch driving adapter assembly 24 for rotation therewith, a plate 102 carried by the driving spider 25 and the stub shaft flange 26 being universally connected at 104 to the adjacent end of the air tube 100.

To insure disengagement of the several clutch plates upon deflation of either actuating tube, a plurality of radially and equiangularly spaced spring biased bolts 106 extend longitudinally through the housing end plates 30 and 32 and engage the inner and outer peripheries of the intermediate finger plates 88 and 90 to bias these plates toward abutment with the housing end plates against the inflation biasing action of the actuating tubes 80 and 82. Each inner bolt connection also carries a leaf spring clip 108 tending to maintain the adjacent shoe mounting plate 42 or 48 in abutment with its adjacent intermediate finger plate 88 or 90 for movement therewith. A second plurality of leaf spring clips 110 maintain the other shoe mounting plates 44 and 46 in abutment with the intermediate housing flanges 38 and 40, respectively. Thus the spring biased bolts 106 and the spring clips 108 and 110 serve to positively disengage the several shoe mounting plates from the driven plates 56 and 58 upon deflation of the actuating tubes 80 and 82, respectively.

Upon disengagement of the clutch units, relative rotation between the several plates tends to center the driven output plate 56 or 58 axially between the shoes of the driving plates. The designed clearances necessarily provided between the splines at 60 and 68 for the accommodation of wear and misalignment are such that limited wobble and radial and axial bouncing of the clutch plates 56 and 58 would occur normally during such periods of disengagement. Such plate movement would result in intermittent frictional drag and uneven wear between the clutch elements and in destructive chattering or impacting of the several spline connections. In accordance with certain limited aspects of the invention, a plurality of leaf spring clips 112 of bowed configuration are inserted between equiangularly spaced pluralities of the opposing root and outer lands of the splines formed on the driven clutch plates 56 and 58 and the mating spline rings 62 and 70, respectively. Each spring clip 112 has two relatively short reverse or S-bend leg portions 112' which are joined by an elongated and slightly bowed bight portion 112". Prior to final clutch assembly, the spring clips 112 are retained on the driven plates 56 and 58 by the leg portion 112' which resiliently engage the axial end faces of the several plate hubs 56" and 58". In assembly, radial deflections of the several spring clip bight portions 112" serve to radially center the driven plates 56 and 58 with respect to their driven hubs and frictionally damp axial movement of the disengaged plates with respect thereto.

The driving spider 25 is perforated to define an annular plurality of equiangularly spaced ports 114 separated by radial spokes or bridges 116. This porting of the driving spider further contributes to its alignment accommodating flexibility. The ahead driving hub 64 and the hubs of the driven plates 56 and 58 are also annularly perforated to define ports 118, 120 and 122, respectively. The several ports 114, 118, 120 and 122 and the annular clearance at 124 between the end plate 32 and the stub shaft 72 cooperate with radial air flow inducing fan passages defined by the several engine driven clutch elements to insure adequate cooling air flow for dissipation of the heat generated during controlled slip operation and high speed reversals. The several air flow inducing fan passages include a plurality of ports 126, 128, 130, 132, 134 and 136 extending radially through the cylindrical outer portions of the intermediate housing members 34 and 36. The ports 126 and 136 register with radial passages defined between the spokes or fingers 84 and 86 of the intermediate actuating plates 88 and 90, respectively. The inwardly extending flange portions of the housing members 34 and 36 are slotted to provide similar radial fan passages 138 and 140 with the shoe mounting backing plates 44 and 46. These passages register with the outer ports 130 and 132. The spacing of the several friction shoes 50 defines a plurality of radial fan passages 142 therebetween of substantial capacity. These passages communicate with the housing ports 126–136 and provide continuous cooling air flow between the driving shoes and over the frictionally engaging surfaces of the driving shoes and driven plates. The continuous air flow provided by the fan passages of the several engine driven clutch elements and the use of limited segment friction shoes serve to minimize and prevent heat induced distortions and excessive wear of the friction shoe material and of the driven clutch plates.

From the foregoing description of a preferred illustrative embodiment, it will be apparent to those skilled in the art that various modifications and changes might be made therein without departing from the spirit and scope of the invention as defined in the following claims.

What is claimed is:

1. A torque transmitting mechanism comprising a cylindrical housing having spline teeth formed internally thereof, a shaft extending coaxially of said housing and having external spline teeth spacedly embraced by the internal spline teeth of said housing, a plate normal to and having internal spline teeth drivingly and slidably engaging the splines of said shaft, a pair of plates mounted within said housing in flanking relation to said first-mentioned plate and having external spline teeth slidably and drivingly engaging the internal splines of said housing, actuating means operable to effect frictional engagement between said plates, spring means acting on said flanking plates to release frictional engagement with said first-mentioned plate upon deenergization of the actuating means, and a plurality of leaf spring clips inserted and extending radially and axially between opposing root and outer lands of an angularly spaced plurality of the splines mounting said first-mentioned plate, said spring clips radially centering and frictionally damping axial movement of the first-mentioned plate relative to said shaft.

2. In a frictionally engaged torque transmitting mechanism, a cylindrical housing member, a hub member mounted in spaced coaxial relation within said housing member for rotation relative thereto, a first plate mounted on and having internal spline teeth drivingly and slidably engaging external spline teeth carried by said hub member, a second plate parallel to said first plate and having external spline teeth slidably and drivingly engaging internal spline teeth carried by said huosing member, actuating means associated with said second plate and energizable to effect frictional engagement axially between said plates, spring means acting on said second plate to release frictional engagement between said plates upon deenergization of the actuating means, and a plurality of leaf spring clips interposed between and extending radially and axially of opposing root and outer lands of angularly spaced splines mounting said first plate on said hub, said spring clips being bowed intermediate their respective mounting lands and radially centering and frictionally damping axial movement of the first plate relative to said hub member.

3. In a clutch mechanism, two cylindrical members mounted in spaced concentric relation for relative rotation therebetween, first plate means having internal splines drivingly and slidably engaging external splines carried by the inner one of said members, second plate means having external splines slidably and drivingly engaging internal splines carried by the outer one of said members, actuating means energizable to effect frictional driving engagement axially between said plate means, spring means acting on one of said plate means to release frictional engagement between said plate means upon deenergization of the actuating means, and a plurality of leaf spring clips interposed and extending axially between opposing lands of a plurality of angularly spaced splines drivingly connecting the other of said plate means to its respective mounting member, said spring clips radially centering and frictionally damping axial movement of said other plate means relative to its mounting member.

4. In a clutch mechanism, two cylindrical members mounted in spaced concentric relation for relative rotation therebetween, first plate means having splines drivingly and slidably engaging splines carried by one of said members, second plate means having splines slidably and drivingly engaging splines carried by the other of said members, actuating means selectively energizable to effect frictional driving engagement axially between said plate means, and a plurality of leaf spring clips interposed and extending axially between opposing lands of angularly spaced splines drivingly connecting one of said plate means to its respective mounting member, said spring clips being of a bowed configuration radially centering and frictionally damping axial movement of said one plate means relative to its mounting member under disengaged operating conditions.

5. In a torque transmitting mechanism having means for selectively effecting and releasing frictional engagement between a plurality of frictionally engageable plates interposed between and alternately splined to one of two coaxial members mounted for relative rotation therebetween, a plurality of leaf spring clips extending radially and axially between opposing root and outer lands of angularly spaced splines mounting certain of said plates, said spring clips being of a configuration and acting between said opposing lands to radially center and frictionally damp axial movement of said certain plates under disengaged operating conditions.

6. A torque transmitting mechanism comprising a cylindrical drive housing member having a ring of spline teeth formed internally thereof, a driven output member rotatably supported in substantially coaxial relation within said housing member and having external spline teeth thereon spacedly embraced by said housing splines, a driven plate normally interposed between said members and having internal spline teeth drivingly and slidably engaging the splines of said output member, a pair of backing plates mounted within said housing in spaced flanking relation to said driven plate, a plurality of arcuate shoes of non-metallic frictional material equiangularly spaced and secured to each of said backing plates, said shoes being axially engageable with said driven plate and having external spline teeth thereon slidably engaging the internal splines of said housing member and driven thereby, the spacing of said shoes defining a plurality of fan passages therebetween for inducing cooling air flow between the shoes and the shoe engageable surfaces of said driven plate, actuating means operable to effect frictional engagement between said shoes and driven plate, spring means acting on said backing plates to release frictional engagement with said driven plate upon deenergization of the actuating means, and a plurality of leaf spring clips inserted and extending radially and axially between opposing root and outer lands of angularly spaced splines mounting said driven plate, said spring clips being of a bowed configuration intermediate their mounting lands and radially centering and frictionally damping said driven plate to prevent axial movement thereof under engagement released operating conditions.

7. A torque transmitting mechanism capable of accommodating limited misalignment between a driven input shaft and an output shaft and of providing prolonged periods of variable slip operation, said mechanism comprising a cylindrical housing coaxially secured to the driven input shaft and having two axially spaced end walls and a cylindrical outer wall defining an annular inwardly facing chamber, the chamber defining outer wall of said housing having internal spline teeth and a plurality of air circulating ports extending therethrough, the output shaft extending within said housing in substantially coaxial relation to the input shaft and mounted to permit limited angular and lateral misalignment therebetween, a hub secured to the output shaft and having external spline teeth thereon spacedly embraced by the chamber, an output plate extending within the chamber and having internal spline teeth slidably and drivingly engaging the hub splines, a pair of backing plates within the chamber in spaced parallel flanking relation to the output plate, a plurality of arcuately extending shoes of suitable frictional material equiangularly spaced and secured to said backing plates for frictional driving engagement with the output plate, said shoes having external spline teeth thereon slidably and drivingly engaging the internal splines of the housing outer wall, the spacing of said shoes forming a plurality of radial fan passages cooperating with the ports in the housing outer wall to provide continuous heat dissipating cooling air flow between the several shoes and over the shoe engageable surfaces of the output plate, an annular actuating tube mounted within the chamber between one of said end walls and one of the shoe backing plates and inflatable to regulate frictional engagement between the driving shoes and driven plate, an insulating buffer plate interposed between said actuating tube and said one backing plate and defining a plurality of cooling air fan passages therebetween, spring means acting on said backing and buffer plates to release frictional engagement between said driving shoes and driven plate upon deflation of the clutch actuating tube, and a plurality of spring clips interposed and extending radially and axially between the root and outer lands of an angularly spaced plurality of the hub and output plate mounting splines, said spring clips radially centering and frictionally damping axial movement of the driven plates relative to the hub under disengaged operating conditions.

8. A torque transmitting mechanism capable of providing prolonged periods of variable slip operation comprising a cylindrical housing coaxially secured to a first rotatably driven shaft and having two axially spaced end walls and a cylindrical outer wall defining an annular inwardly facing chamber, the chamber defining outer wall of said housing having internal spline teeth and a plurality of air circulating ports extending therethrough, a second shaft extending within said housing in substantially coaxial relation to said first shaft, a first plate drivingly connected to said second shaft and extending within said chamber, a pair of backing plates mounted in spaced parallel flanking relation to said first plate within said chamber, a plurality of arcuately extending shoes of suitable non-metallic frictional material equiangularly spaced and secured to said backing plates for frictional driving engagement with said first plate, said shoes having external spline teeth thereon slidably and drivingly engaging the internal splines of the housing outer wall, the spacing of said shoes forming a plurality of radial fan passages cooperating with the ports in the housing outer wall to provide continuous heat dissipating cooling air flow between said shoes and over the shoe engageable surfaces of the output plate, and actuating means mounted within said chamber and operable to regulate and release frictional engagement between said driving shoes and driven first plate.

9. A torque transmitting mechanism capable of accommodating limited misalignment between a driven input shaft and an output shaft and of providing prolonged periods of variable slip operation, said mechanism comprising a cylindrical housing coaxially secured to the driven input shaft and having internal spline teeth and a plurality of air circulating ports extending therethrough, the output shaft extending within said housing in substantially coaxial relation to said first shaft and having external spline teeth thereon spacedly embraced by said housing, a driven output plate having internal spline teeth slidably engaging said output shaft splines, a pair of backing plates in spaced flanking relation to the driven plate, a plurality of arcuate shoes of frictional material equiangularly spaced and secured to said backing plates for frictional engagement with said driven plate, said shoes having external spline teeth thereon slidably and drivingly engaging the internal splines of the housing, the spacing of said shoes forming a plurality of radial fan passages cooperating with the ports in said housing to provide continuous heat dissipating cooling air flow between the several shoes and over the shoe engageable surfaces of the driven plate, actuating means carried by said housing and operable selectively to regulate and release frictional driving engagement between said driving shoes and driven plate, and a plurality of spring clips interposed and extending radially and axially between the opposed root and outer lands of an angularly spaced plurality of the hub and driven plate mounting splines, said spring clips radially centering and frictionally damping axial movement of the driven plates relative to said hub under disengaged operating conditions.

10. A frictionally engaged torque transmitting mechanism capable of accommodating limited misalignment between an input and an output shaft and of providing prolonged periods of variable slip operation proportional to actuating pressures applied thereto, said mechanism comprising an input housing drum coaxially secured to and rotatably driven by a first prime mover driven shaft, said housing drum having a cylindrical outer wall, two axially spaced end walls and an intermediate wall portion defining two inwardly facing annular chambers, the chamber defining outer walls of said housing having a plurality of air circulating radial ports therethrough and a plurality of spline teeth formed inwardly thereof, a second shaft rotatably mounted to permit limited angular and lateral misalignment with said first shaft, a first hub secured to said second shaft within said housing drum and having external spline teeth thereon spacedly embraced by one of said chambers, a second hub journaled on said second shaft and having external spline teeth thereon spacedly embraced by the other of said housing chambers, reverse gear means drivingly interconnecting said second shaft and second hub to a load driving output shaft, a first driven output plate extending within said one annular chamber and having internal spline teeth thereon slidably and drivingly engaging the splines of said first hub, a second driven output plate extending within said other annular chamber and having internal spline teeth thereon slidably and drivingly engaging the splines of said second hub, a pair of backing plates mounted within each of said annular chambers in spaced parallel flanking relation to the output plate therein, a plurality of arcuately extending shoes of non-metallic frictional material equiangularly spaced and secured to each of said backing rings for frictional engagement with the driven output plates, said non-metallic shoes having external spline teeth thereon slidably and drivingly engaging the cooperating internal splines formed on the housing drum, the angular spacing of said shoes providing a plurality of radially extending fan passages capable of providing continuous heat dissipating cooling air flow over the shoe engageable surfaces of the output plates, an actauting tube mounted between said drum and one of said backing plates within each of said annular chambers, a buffer plate interposed between each of said clutch actuating tubes and the adjacent backing plate and defining a plurality of radially extending fan passages, said actuating tubes being alternately inflatable to effect selective and proportional frictional driving engagement between the prime mover driven shoes and the output plates, spring means acting to release frictional engagement between said driving shoes and each of said output plates upon deflation of the adjacent actuating tube, and a plurality of spring clips interposed longitudinally between the root and outer lands of an angularly spaced plurality of the hub and driven output plates splines, each of said spring clips being of a bent configuration to radially center and frictional damp axial movement of each output plate relative to its driven hub under disengaged operating conditions.

References Cited in the file of this patent

UNITED STATES PATENTS

| | | |
|---|---|---|
| 2,190,874 | Jarrett | Feb. 20, 1940 |
| 2,348,025 | Peets | May 2, 1944 |
| 2,899,038 | Wellauer | Aug. 11, 1959 |
| 2,925,156 | Grant et al. | Feb. 16, 1960 |